Aug. 8, 1950     R. R. ANDERSON     2,517,957
BICYCLE ATTACHMENT
Filed Nov. 5, 1946

Inventor
ROBERT R. ANDERSON,
By McMorrow, Berman and Davidson
Attorneys

Patented Aug. 8, 1950

2,517,957

UNITED STATES PATENT OFFICE 2,517,957

BICYCLE ATTACHMENT

Robert R. Anderson, New Albany, Ind.

Application November 5, 1946, Serial No. 707,924

1 Claim. (Cl. 155—5.13)

This invention relates to bicycle attachments and more particularly to a child's seat with foot rests adapted to be converted into a basket support.

It is an object of the present invention to provide a bicycle attachment which can be converted from an attachment providing a child's seat with foot rest portions into a support for a basket to carry packages.

It is another object of the present invention to provide a combined seat support with foot rests and a basket attachment for a bicycle, wherein the foot rest portions can be removed in one piece from the main supporting part of the attachment when it is only desired that the supporting part of the attachment support a basket and there is no use for the foot rest portions.

It is another object of the present invention to provide an attachment which can be converted from a child's seat arrangement into a basket arrangement for supporting articles or packages which is of simple construction, which has a minimum number of parts, and requires a minimum number of adjustments to effect the conversion of one arrangement to the other, and wherein the parts are simple and cheap to construct.

For other objects and for a better understanding of the invention, reference may be had to the following detailed description taken in connection with the accompanying drawings, in which.

Figure 1:
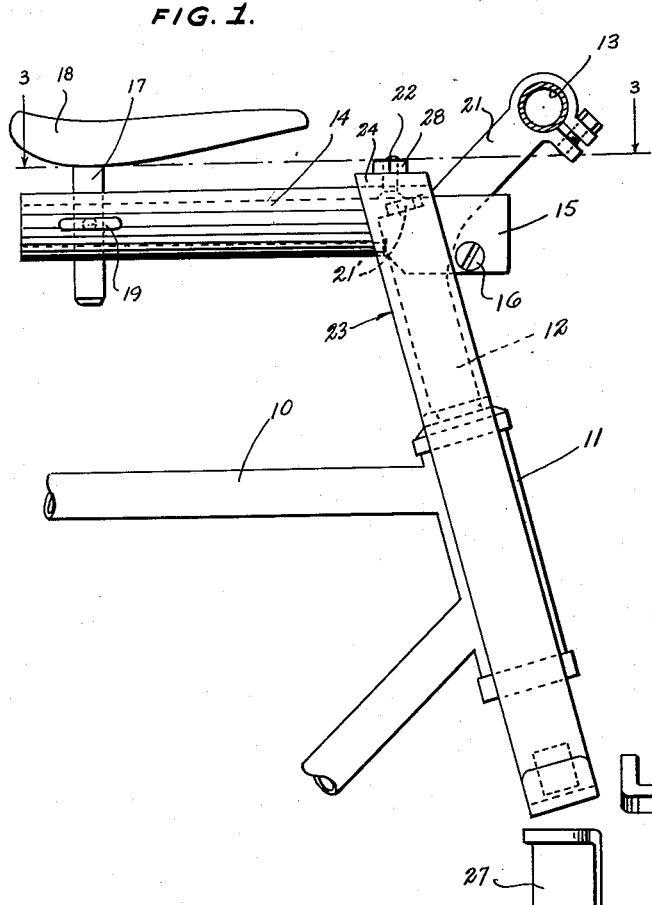
Figure 1 is a fragmentary side elevation view with the attachments connected thereto and adapted to provide a child's seat with foot rests extending downwardly along the front end of the bicycle.
Figure 2:
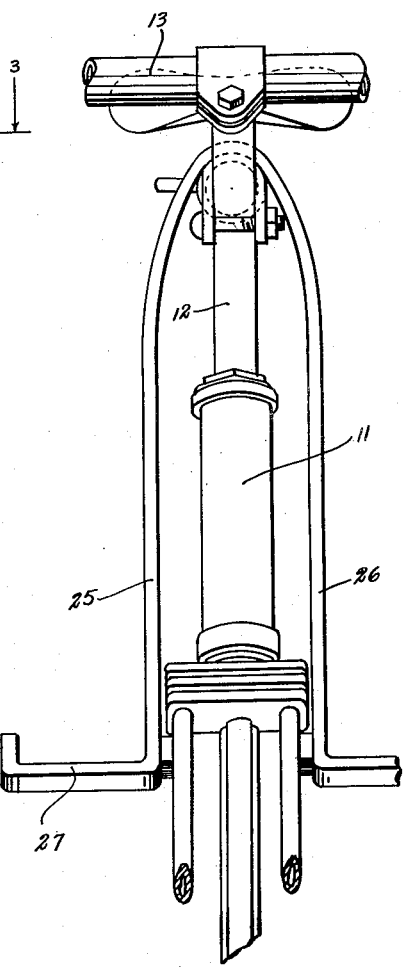
Figure 2 is a front elevational view of the parts of the bicycle and the attachments shown in Figure 1.
Figure 3:
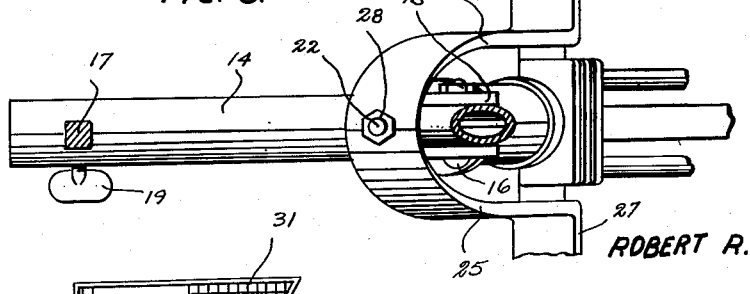
Figure 3 is a cross sectional view taken on line 3—3 of Figure 1 and looking in the direction of the arrows thereof.
Figure 4:
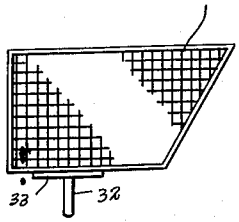
Figure 4 is a side elevational view of the basket with its post serving to effect its connection with the support from which the seat has been removed.

Referring now to the figures, 10 represents the front portion of a bicycle having a front sleeve 11 into which a steering post 12 extends. From this post 12 there is extended outwardly therefrom the handle bars 13. Extending rearwardly from the top of the post 12 is a member 14 having on its forward end bifurcated portions 15 with a screw 16 extending between them. On the rear end of the member there is provided an opening into which can be extended a post 17 supporting a seat 18. The seat can be adjusted relative to the member 14 to any desired height and retained in the adjusted position by a winged screw 19. The bifurcated portions 15 astride the steering post and extend to a point forwardly thereof. The screw 16 extending between the portions 15 will retain the member 14 in place by engagement with a forwardly extending portion 21 of the steering post 12. The steering post 12 is provided at its top with the usual adjusting bolt 21', and this bolt is used for positioning the steering post and handle bars in their proper relation to the front wheel of the bicycle. On the top of the member 14 and adjacent the bifurcated portion, there is rigidly secured an upstanding stud 22. The bottom of the stud and portions of the interior of the member 14, which is hollow, will engage with the top of the steering post 12 so that downward tilting movement of the rearward end of the member 14 will be prohibited.

Adapted to be connected to the stud 22, is an inverted U-shaped member 23 having a perforated transverse portion 24 and depending leg portions 25 and 26 extending downwardly at opposite sides of the front portion 11 of the bicycle and having on their lower ends laterally extending foot rests 27. The upper portion 24 is curved to follow the contour of the round member 14 and is made secure upon the stud 22 by a fastening nut 28.

With the seat in place a child can be set upon the seat with its legs extending downwardly into place upon the foot rest portions 27. The seat can be adjusted to any height depending upon the length of the legs of the child. At times when the attachment is not needed to support a child and it is desired that the same be converted into a support for a basket, the winged headed screw 19 is loosened and the seat withdrawn and a basket 31 is connected into the member 14 by means of its depending post 32. A plate 33 on the bottom of the basket will serve to make the connection of the depending member 32 therewith. If desired the inverted U-shaped member 23 bearing the foot rest can be totally removed from the front of the bicycle. This may be effected by simply unscrewing the nut 28 and removing the inverted U-shaped member 23 from the stud 22.

While various changes may be made in the detailed construction, it shall be understood that such changes shall be within the spirit and scope of the present invention as defined by the appended claim.

What is claimed is:

A child's seat attachment for bicycles having a generally vertical steering post including a forwardly projecting arm, said attachment comprising a substantially horizontal elongated tubular member constructed and arranged for attachment to the steering post and extending rearwardly thereof and having a forward open end, forwardly projecting side extensions secured to the forward end of the tubular member and disposed upon opposite sides of the steering post and close to the same and projecting forwardly of the steering post, a single transverse bolt extending through the forward ends of the side extensions and engaging beneath the arm, a seat mounted upon the tubular member near its rear end, an inverted U-shaped member engaging over the tubular member near its forward end, means mounted upon the tubular member for detachably securing the U-shaped member thereto, and lateral extensions secured to the lower end of the U-shaped member for engagement by the feet of the child while seated upon the seat.

ROBERT R. ANDERSON.

REFERENCES CITED

The following references are of record in the file of this patent:

UNITED STATES PATENTS

| Number | Name | Date |
|---|---|---|
| 1,067,723 | Fentress | July 15, 1913 |
| 1,154,625 | Gutenkunst | Sept. 28, 1915 |
| 2,376,713 | Murrell | May 22, 1945 |
| 2,380,497 | Bound | July 31, 1945 |
| 2,448,867 | Darden | Sept. 7, 1948 |

FOREIGN PATENTS

| Number | Country | Date |
|---|---|---|
| 7,581 | Great Britain | 1907 |
| 475,990 | France | Apr. 10, 1915 |
| 439,134 | Germany | Jan. 4, 1927 |